United States Patent
Gamage et al.

(10) Patent No.: US 8,457,256 B2
(45) Date of Patent: Jun. 4, 2013

(54) CHANNEL-ADAPTIVE LIKELIHOOD DETERMINATION

(75) Inventors: Sahan S. Gamage, Cambridge (GB); Bernard Arambepola, Enfield (GB); Thushara Hewavithana, Borehamwood (GB); Parveen K. Shukla, Nottingham (GB); Vinesh Bhunjun, Potters Bar (GB)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 12/862,951

(22) Filed: Aug. 25, 2010

(65) Prior Publication Data

US 2012/0051469 A1 Mar. 1, 2012

(51) Int. Cl.
*H03D 1/00* (2006.01)

(52) U.S. Cl.
USPC ........... 375/341; 375/340; 375/316; 375/324; 375/325; 375/219

(58) Field of Classification Search
USPC ................. 375/341, 340, 316, 324, 325, 219
See application file for complete search history.

(56) References Cited

U.S. PATENT DOCUMENTS

| | | | |
|---|---|---|---|
| 2004/0136313 A1* | 7/2004 | Goldstein et al. | 370/203 |
| 2007/0206696 A1 | 9/2007 | Su | |
| 2008/0212694 A1* | 9/2008 | Leach et al. | 375/260 |
| 2008/0291888 A1* | 11/2008 | Maret et al. | 370/342 |
| 2009/0060078 A1* | 3/2009 | van Zelst et al. | 375/262 |
| 2010/0260251 A1* | 10/2010 | Yokomakura et al. | 375/232 |

FOREIGN PATENT DOCUMENTS

| | | |
|---|---|---|
| WO | 2007/112472 A1 | 10/2007 |
| WO | 2012/027303 A2 | 3/2012 |
| WO | 2012/027303 A3 | 4/2012 |

OTHER PUBLICATIONS

International Search Report and Written Opinion received for PCT Application No. PCT/US2011/048699, mailed on Feb. 17, 2012; 9 pages.

\* cited by examiner

*Primary Examiner* — Kenneth Lam
(74) *Attorney, Agent, or Firm* — Garrett IP, LLC

(57) ABSTRACT

Methods and systems to compute likelihood measures of demodulated, complex-coordinate data points, to and dynamically scale the likelihood measures as a function of a channel statistic, and to decode the data points from the scaled likelihood measures. Likelihood measures may be computed relative to all points, or a subset of points of a reference constellation, such as a subset of one or more nearest constellation points. Likelihood measures may be scaled as a function of a channel frequency response variance amongst a plurality of carriers, such as carriers of an OFDM signal, and/or as a function of a channel impulse response variance.

14 Claims, 12 Drawing Sheets

Bit Convention: ($n_1, n_2, n_3, n_4, n_5, n_6$)

Bit Convention: ($n_1$, $n_2$, $n_3$, $n_4$, $n_5$, $n_6$)

Bit Convention: ($n_1, n_2, n_3, n_4, n_5, n_6$)

CHANNEL-ADAPTIVE LIKELIHOOD DETERMINATION

BACKGROUND

A plurality of data bits may be encoded as a complex coordinate data point. The encoding may be in the form of quadrature modulation of a carrier signal. A receiver may be configured to demodulate and sample the carrier signal, determine complex coordinates of the samples, and correlate the complex coordinates with points of a reference constellation. Each point of the reference constellation is associated with a unique set of bit values, such that a correlation to a point of the reference constellation provides a corresponding set of decoded bit values. The correlation may include computing a log-likelihood ratio (LLR) for each of plurality of bits of a data point, relative to points of the reference constellation.

A LLR may be computed as a function of distances between complex coordinates of the data point and every point of a reference constellation, in accordance with a full logarithmic maximum-a-posteriori (Full-Log-MAP) LLR technique. A Full-Log-MAP technique may be relatively expensive to implement in terms of processing time and resource consumption.

Where a Log-MAP function utilizes distances to less than all points of a reference constellation, decoding performance may be adversely affected.

BRIEF DESCRIPTION OF THE DRAWINGS/FIGURES

Figure 1:
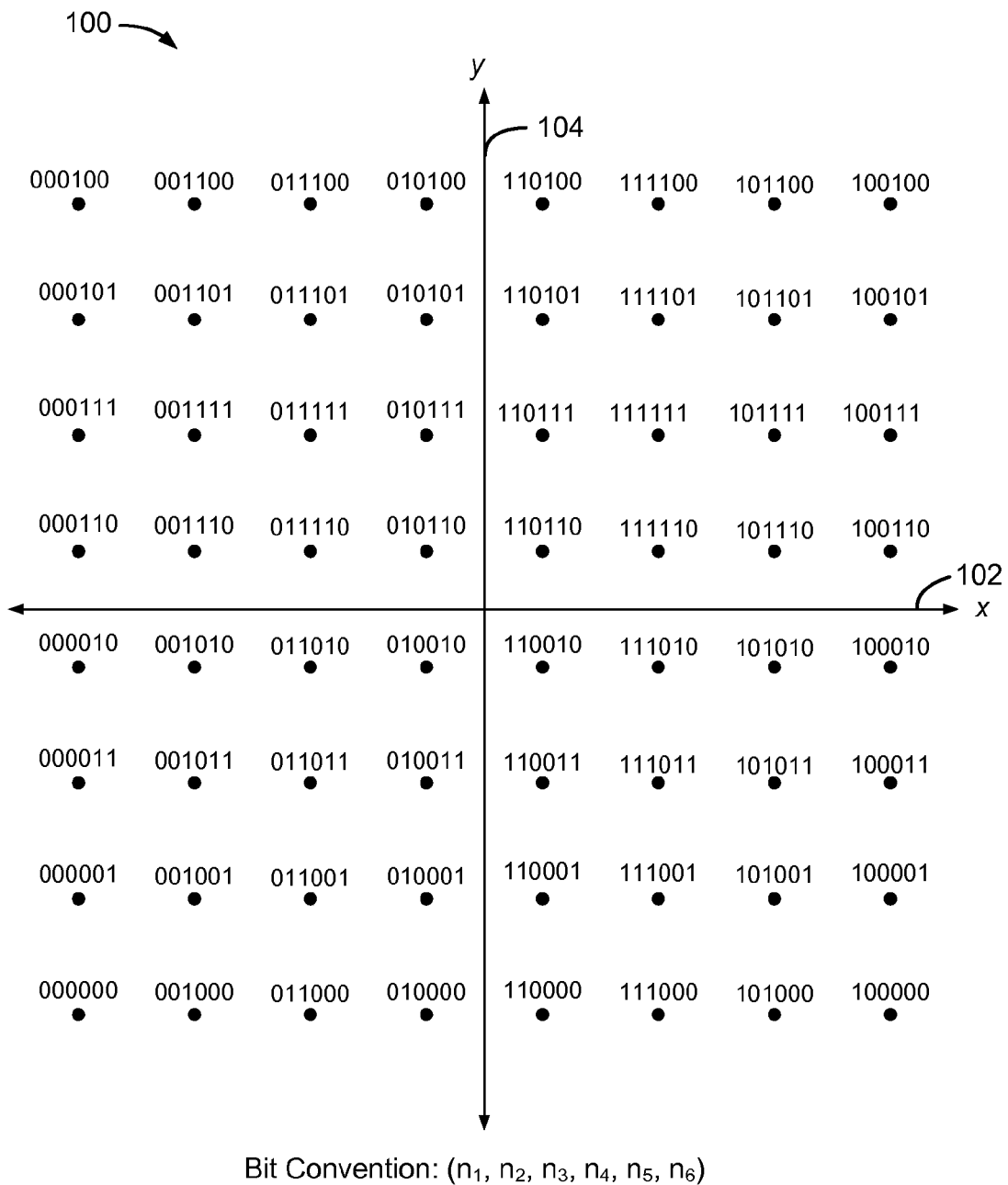
FIG. 1 is a diagram of a 64-point rectangular constellation, including example bit values.

In the drawings, the leftmost digit(s) of a reference number identifies the drawing in which the reference number first appears.

DETAILED DESCRIPTION

FIG. 1 is a diagram of a 64-point rectangular constellation 100.

Each point within constellation 100 represents a set of n-bits, illustrated here as six bits, $n_1$ through $n_6$. Each set of n-bit values is exclusive to the corresponding point. FIG. 1 includes example bit value assignments. Other bit value assignments may be utilized.

Constellation 100 is illustrated with respect to an x-axis 102 and a y-axis 104. The x and y axes 102 and 104 may correspond to real and imaginary axes, respectively, and coordinates of points within constellation 100 may represent a corresponding set of complex coordinates.

Complex coordinates of points within constellation 100 may be imparted to one or more carrier signals, such as with a quadrature modulation technique, where x and y coordinates may correspond to in-phase and quadrature-phase components of a carrier signal, respectively. When complex coordinates of a constellation point are imparted to a carrier, the corresponding bit set is referred to as encoded within or on the carrier.

Constellation 100 may correspond to a 64-point quadrature amplitude modulation (64-QAM) scheme. Other constellation schemes may be utilized, including, without limitation, 256-QAM, and non-rectangular constellation schemes.

A receiver may demodulate and sample a received signal to obtain complex coordinates, and correlate the complex coordinates with coordinates of points of a reference constellation to identify an encoded bit set. For a multi-carrier signal, such as an orthogonal frequency division multiplexed (OFDM) signal, a reference constellation may be defined by real and imaginary axes of pilot carriers.

Figure 2:
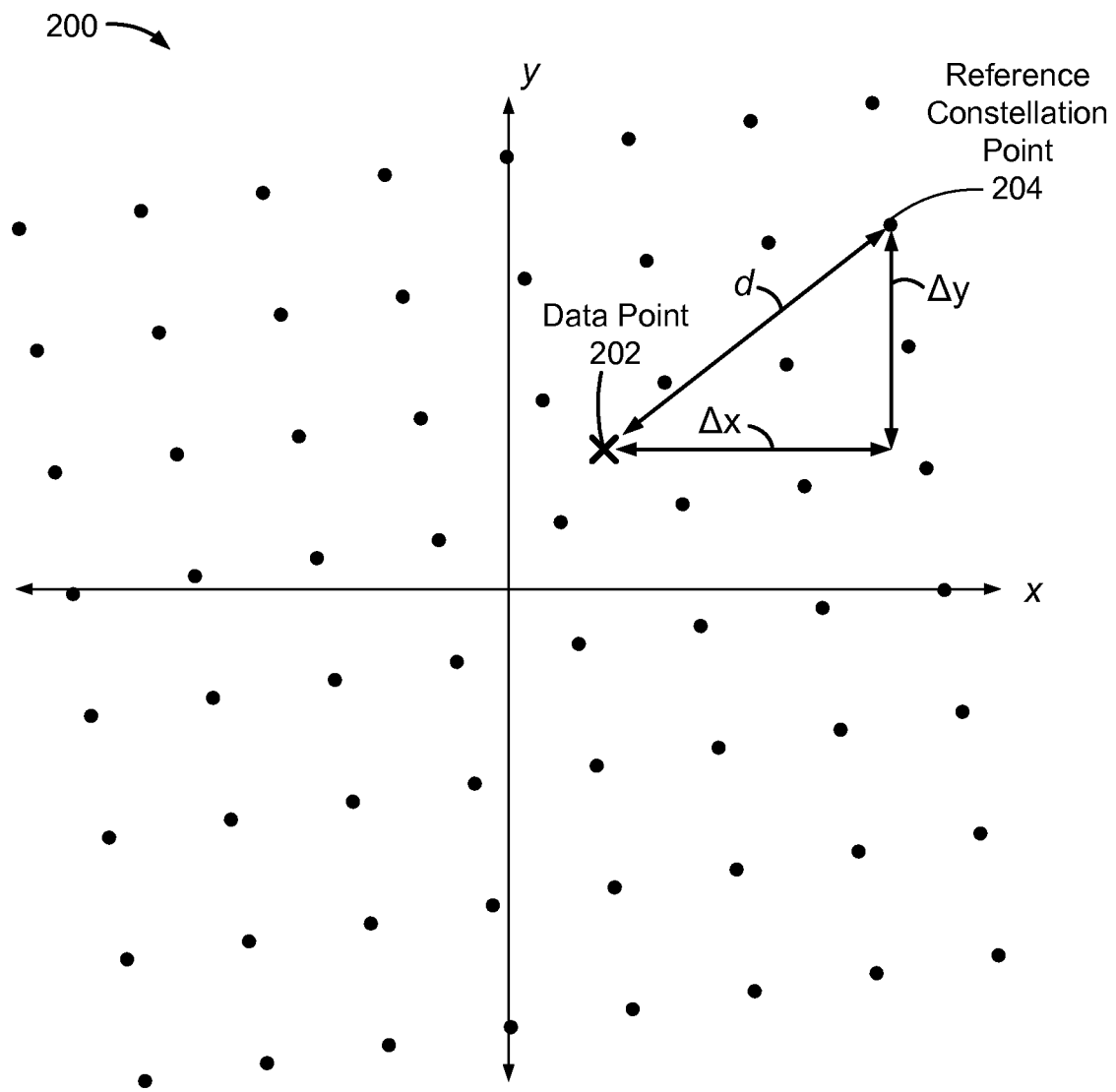
FIG. 2 is a diagram of a reference constellation.

FIG. 2 is a diagram of a reference constellation 200, and a demodulated data point 204 representative of a set of demodulated complex coordinates.

In FIG. 2, reference constellation 200 is illustrated as rotated relative to x and y axes. A carrier may be intentionally rotated relative to a reference constellation, such as to permit data recovery in the event of a spectral null. Methods and systems disclosed herein may be implemented with respect to rotated carriers and non-rotated carriers.

In order to identify or decode bit values represented by data point 202, complex coordinates of data point 202 may be correlated with complex coordinates of a point of reference constellation 200.

Correlation may include computing likelihood measures for each bit of data point 202, as a function of distances between data point 202 and points of reference constellation 200, such as described below with respect to FIG. 3.

Figure 3:
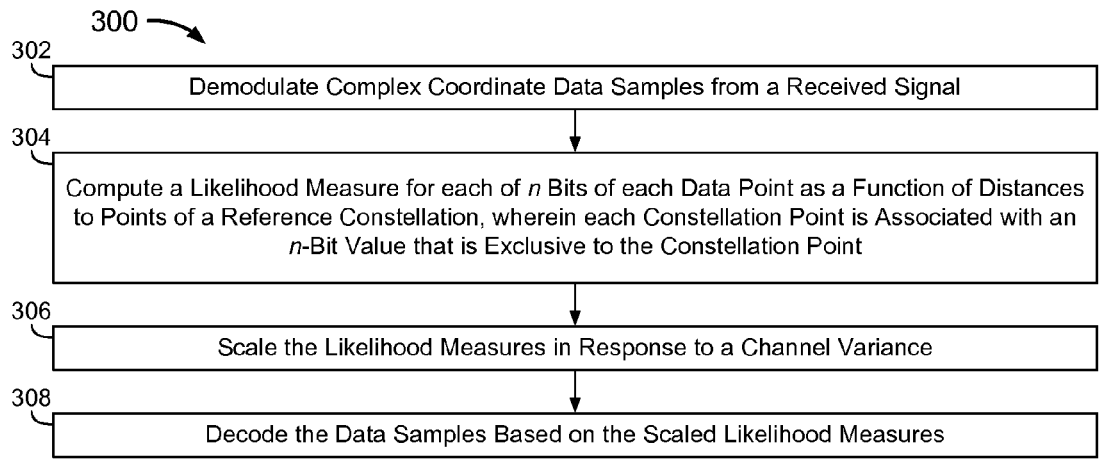
FIG. 3 is a flowchart of a method of computing likelihood measures for each of n-bits of a data point, scaling the likelihood measures in response to a channel variance, and decoding the data point from the scaled likelihood measures.

FIG. 3 is a flowchart of a method 300 of computing likelihood measures for each of n-bits of a data sample, scaling the likelihood measures in response to a channel variance, and decoding the data sample from the scaled likelihood measures. Method 300 is described below with respect to 64-point reference constellation 200 in FIG. 2. Method 300 is not, however, limited 64-bit constellations.

At 302, complex coordinate data samples are demodulated from a received signal. The received signal may include a multi-carrier signal, such as an OFDM signal in accordance with a DVB standard, such as DVB-T2. A set of demodulated complex coordinates may be represented as data point 202 in FIG. 2.

At 304, likelihood measures are computed for each of n bits of a set of complex coordinates. The likelihood measures may be computed as a function of distances to points of a reference constellation, such as reference constellation 200 in FIG. 2.

A distance d between a data point and a constellation point may be determined as:

$$d^2 = (\Delta x)^2 + (\Delta y)^2 \qquad \text{Eq. 1}$$

In FIG. 2, distance d is illustrated with respect to data point 202 and a point 204 of reference constellation 200.

With a multi-carrier signal, data may be interleaved over multiple carriers, such that real and imaginary portions of transmitted data may not be transmitted on the same carrier. As a result, noise power or signal-to-noise ratios (SNRs) of x and y coordinates of a demodulated data point may differ from one another.

A demodulator may be configured to produce a complex value and an SNR estimate for each data carrier, and a distance computation may account for different noise powers in the x and y coordinates of a data point. For example, distance d may be determined as:

$$d = (\Delta x)^2 \rho_x + (\Delta y)^2 \rho_y, \qquad \text{Eq. 2}$$

where $\rho_x$ and $\rho_y$ represent SNRs of x and y axes, respectively.

Likelihood measures may be computed as a function of distances to all points of the reference constellation, or to a subset of point of the reference constellation, such as described below with respect to one or more of FIGS. 4, 5, and 6.

Figure 4:
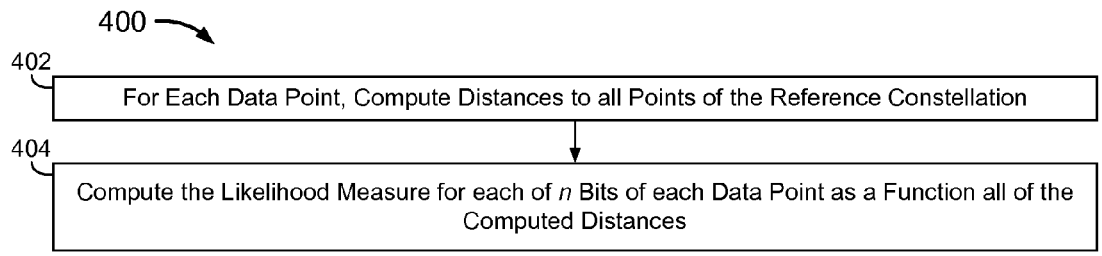
FIG. 4 is a flowchart of a method of computing likelihood measures as a function distances to all points of a reference constellation.

FIG. 4 is a flowchart of a method 400 of computing likelihood measures as a function distances to all points of a reference constellation.

At 402, for each data point, distances to all points of a reference constellation are computed.

At 404, a likelihood measure is computed for each of the n bits of each data point, as a function of all of the computed distances.

Figure 5:
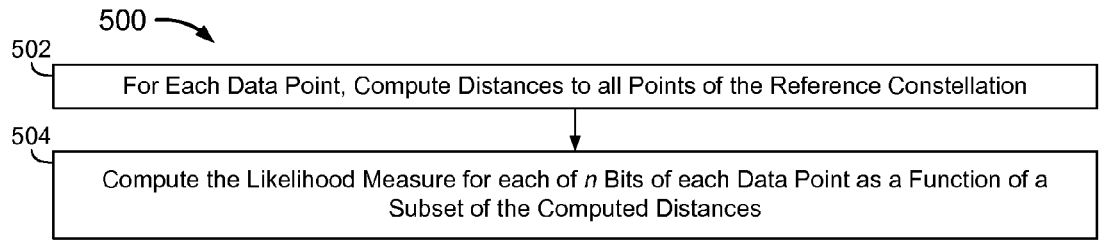
FIG. 5 is a flowchart of a method of computing likelihood measures as a function of distances to a subset of points of a reference constellation.

FIG. 5 is a flowchart of a method 500 of computing likelihood measures as a function of distances to a subset of points of a reference constellation.

At 502, for each data point, distances to all points of a reference constellation are computed, such as described above with respect to 402 in FIG. 4.

At 504, a likelihood measure is computed for each of the n bits of each data point, as a function of a subset of the distances computed at 502. The subset of distances may be selected based on proximity of a data point to points of the reference constellation, such as described in examples below.

Figure 6:
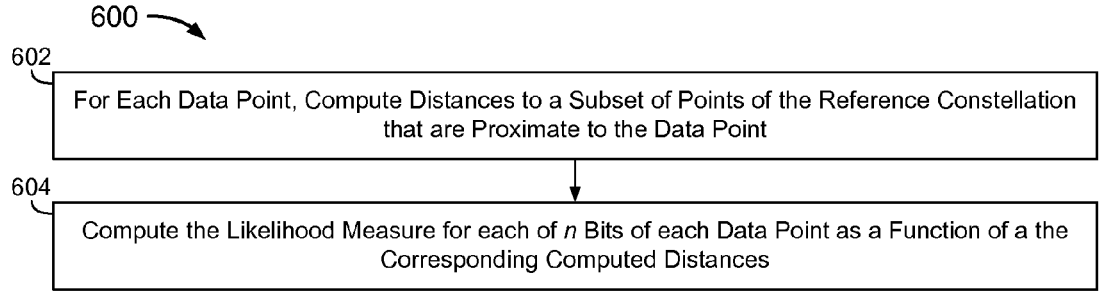
FIG. 6 is a flowchart of another method of computing likelihood measures as a function of distances to a subset of points of a reference constellation.

FIG. 6 is a flowchart of a method 600 of computing likelihood measures as a function of distances to a subset of points of a reference constellation.

At 602, for each data point, distances are computed to a subset of points of the reference constellation. The subset of points may be selected based on proximity to a demodulated data point, such as described in examples below.

At 604, a likelihood measure is computed for each of the n bits of each data point, as a function of the corresponding distances computed at 602.

Returning to 304 in FIG. 3, for each bit of a demodulated data point, the likelihood measure may be computed as a function of a distance from the data point to one or more constellation points for which the corresponding bit is 1, and a distance from the data point to one or more constellation points for which the corresponding bit is 0. Examples are disclosed below.

In examples below, for a particular bit position $n_i$ of a data point, constellation points for which the bit position value are 1 are referred to as set S1, and constellation points for which the bit position value are 0 is referred to as set S2. Sets S1 and S2 may not intersect, and a union of sets S1 and S2 may encompass all points of a reference constellation.

Figure 7:
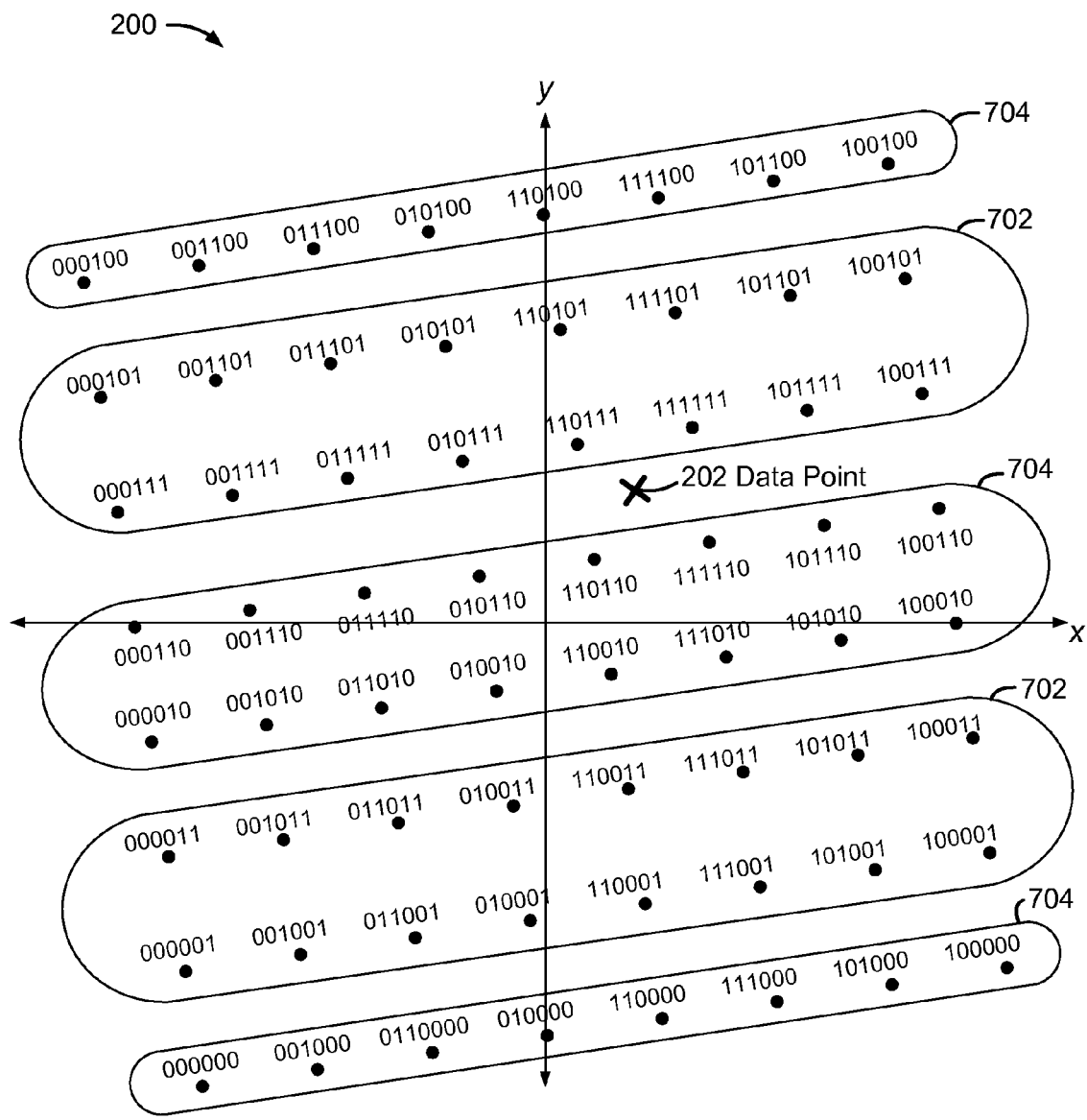
FIG. 7 is another diagram of the reference constellation of FIG. 2.

FIG. 7 is another diagram of reference constellation 200 to illustrate example sets S1, 702, and S2, 704, with respect to bit position $n_6$. In FIG. 7, the example bit values of FIG. 1 are shown for illustrative purposes. Set S1 702 includes constellation points for which bit $n_6$ is 1. Set S2 704 includes constellation points for which bit $n_6$ is 0. Sets S1 and S2 will differ for bits $n_1$ through $n_5$.

A likelihood measure may be computed for bit $n_6$ of data point 202 as a function of a distance between data point 202 and one or more points of set S1 702, and a distance between data point 202 and one or more points of set S2 704.

The likelihood measure may be computed in accordance with a maximum-a-posteriori (MAP) algorithm, or a logarithmic MAP (Log-MAP) algorithm of equation 3:

$$\log(\Sigma_{i \in S1} \exp(-d_i^2)) - \log(\Sigma_{i \in S2} \exp(-d_i^2)), \qquad \text{Eq. 3}$$

In equation 3, the summation term on the left is carried out over set S1. The summation term on the right is carried out over set S2. Distances to all constellation points are used, as illustrated in FIG. 4. This is referred to herein as a Full-Log-MAP technique.

A Full-Log-MAP technique may be relatively expensive in terms of processing time and system resource consumption. For example, in FIG. 7, set S1 702 and set S2 704 each include 32 constellation points. Equation 3 involves computing and summing 32 exponentials of set S1, computing and summing 32 exponentials of set S2, computing logarithms of the summed results of sets S1 and S2, and computing a difference between the logarithms of sets S1 and S2. This is performed for all six bits of every demodulated data sample. Costs in terms of processing time and resources may be relatively expensive for lower-priced consumer goods.

Alternatively, a likelihood measure may be determined as a function of distances to a subset of constellation points, such as described above with respect to one or more of FIGS. 5 and 6, and as described in examples below.

In a first example, a likelihood measure may be determined as a function of a distance to a nearest point of set S1 and a distance to a nearest point of set S2, such as described below with respect to FIG. 8.

Figure 8:
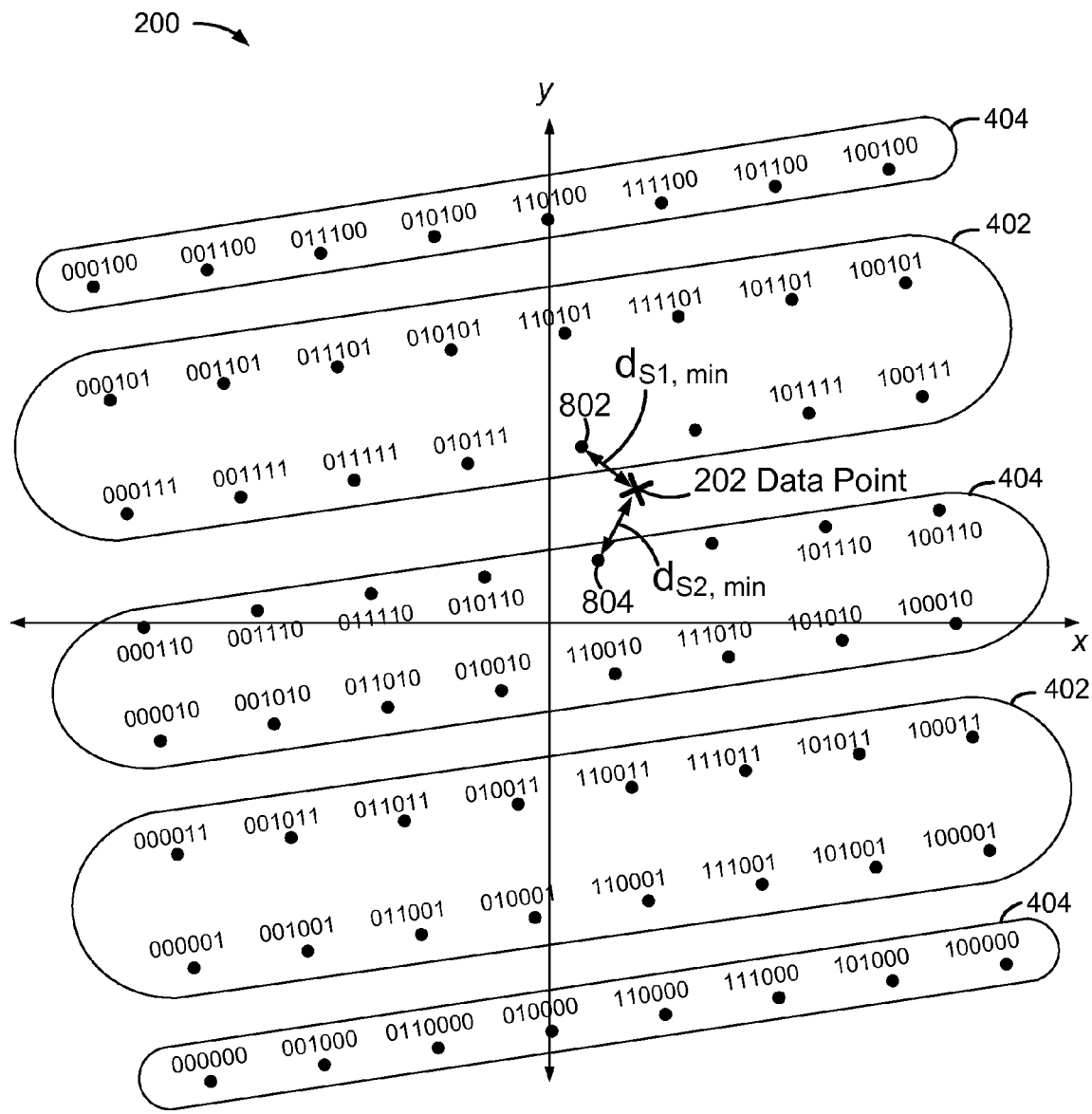
FIG. 8 is another diagram of the reference constellation of FIG. 2.

FIG. 8 is another diagram of reference constellation 200 to illustrate a distance $d_{S1,min}$ between data point 202 and a nearest point 802 of set S1, and a distance $d_{S2,min}$ between data point 202 and a nearest point 804 of set S2, with respect to bit $n_6$.

A likelihood measure may be computed as a function of distances $d_{S1,min}$ and $d_{S2,min}$ in accordance with a with a Max-Log-MAP algorithm of equation 4:

$$\log(\exp(-d_{S1,min}^2)) - \log(\exp(-d_{S2,min}^2)), \qquad \text{Eq. 4}$$

which may be implemented as equation 5:

$$d_{S2,min}^2 - d_{S1,min}^2 \qquad \text{Eq. 5}$$

In another example, a likelihood measure may be determined as a function of distances to multiple nearest points of set S1, and distances to multiple nearest points of set S2, such as described below with respect to FIG. 9.

Figure 9:
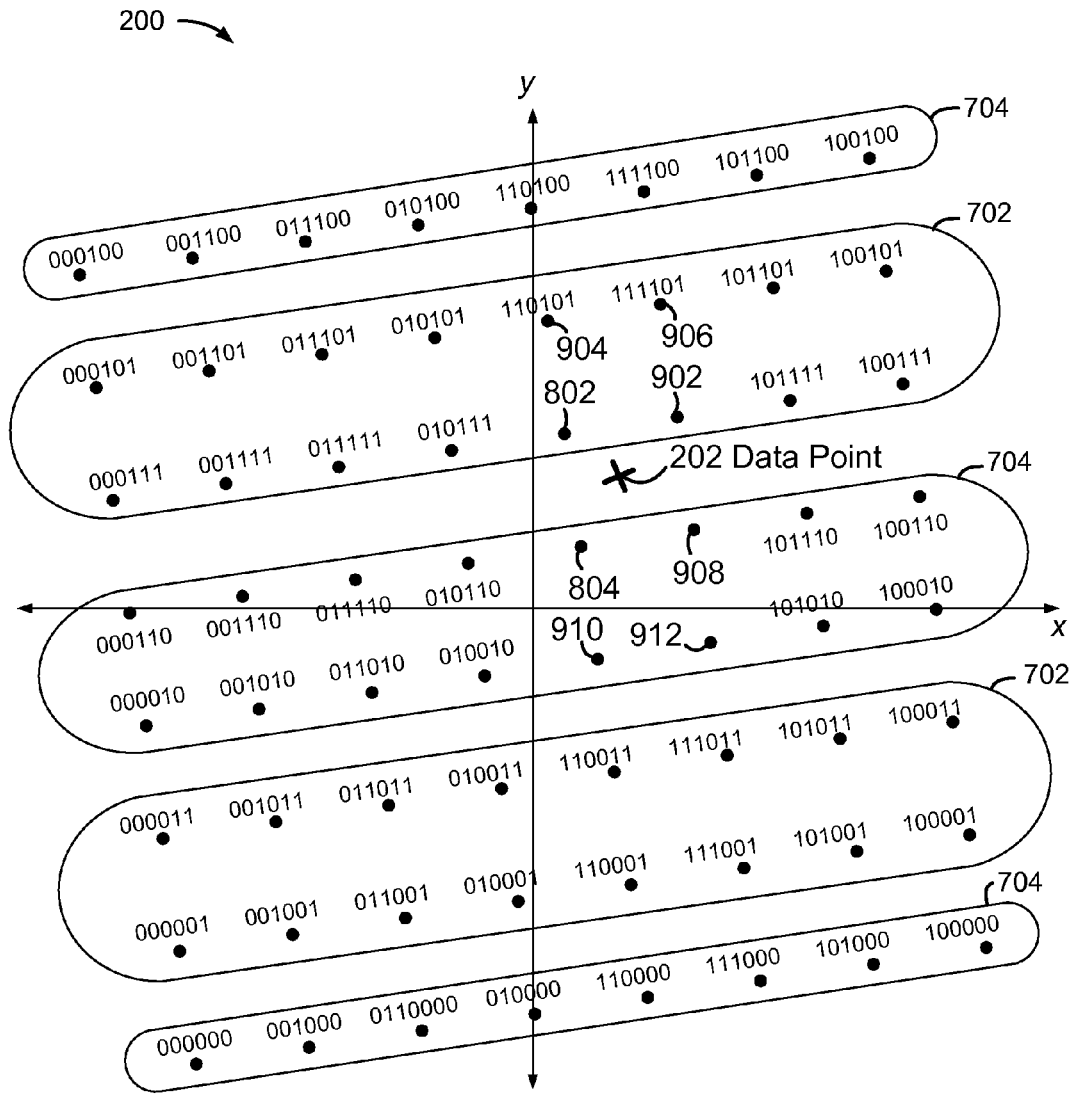
FIG. 9 is another diagram of the reference constellation of FIG. 2.

FIG. 9 is another diagram of reference constellation 200, to illustrate four nearest constellation points of set S1 (points 802, 902, 904, and 906), and four nearest constellation points of set S2 (points 804, 908, 910, and 912), with respect to a bit $n_6$ of data point 202.

A likelihood measure may be computed as a function of distances between data point 202 and each of constellation points 802, 902, 904, and 906, and distances between data point 202 and each of constellation points 804, 908, 910, and 912. This is referred to herein as a Max-4-Log-MAP.

A likelihood measure may be computed as a function of distances between data point 202 and other subsets of constellation points.

Where distances are computed in accordance with equation 2, and where SNR in x and y axes differ, a nearest point may not necessarily coincide with a nearest point as illustrated in FIGS. 8 and 9.

Where likelihood measures are computed at 304 as a function of distances to less than all constellation points, distances may be computed with respect to less than all constellation points, such as described above with respect to FIG. 6. For example, a preliminary determination may be made to identify constellation points within a range or area of a demodulated data point, and distances may be computed only with respect to reference constellation points within the area or range.

At 306 in FIG. 3, the likelihood measures computed at 304 are scaled as a function of a channel variance. Scaling may improve the likelihood measures computed at 304, such as where the likelihood measures are determined from distances to less than all reference constellation points. Scaling may also be implemented with respect to a Full-Log-MAP LLR technique.

Scaling at 306 may include computing a variance factor as a function of one or more channel statistics, comparing the variance factor(s) to one or more thresholds, and selecting one of a plurality of scaling factors based on results of the comparing.

Where a likelihood measure is computed in accordance with equation 4 or 5, for example, the likelihood measure may be scaled in accordance with a scaling factor K, as:

$$\text{Scaled } LLR = K(d_{S2,min}^2 - d_{S1,min}^2). \quad \text{Eq. 6}$$

A variance factor may be compared to a single threshold to select between two scaling factors. Alternatively, a variance factor may be compared to multiple thresholds to select amongst multiple scaling factors, such as to provide finer scaling granularity.

A scaling factor may be selected in response to multiple channel statistics or variance factors.

A variance factor may be determined with respect to echoes and/or multi-path, and may be determined as a function of a channel frequency response and/or channel impulse response. For example, where the received signal includes multiple carriers, such as an OFDM signal, a variance factor may be determined with respect to a channel frequency response variance amongst the multiple carriers.

Figure 10:
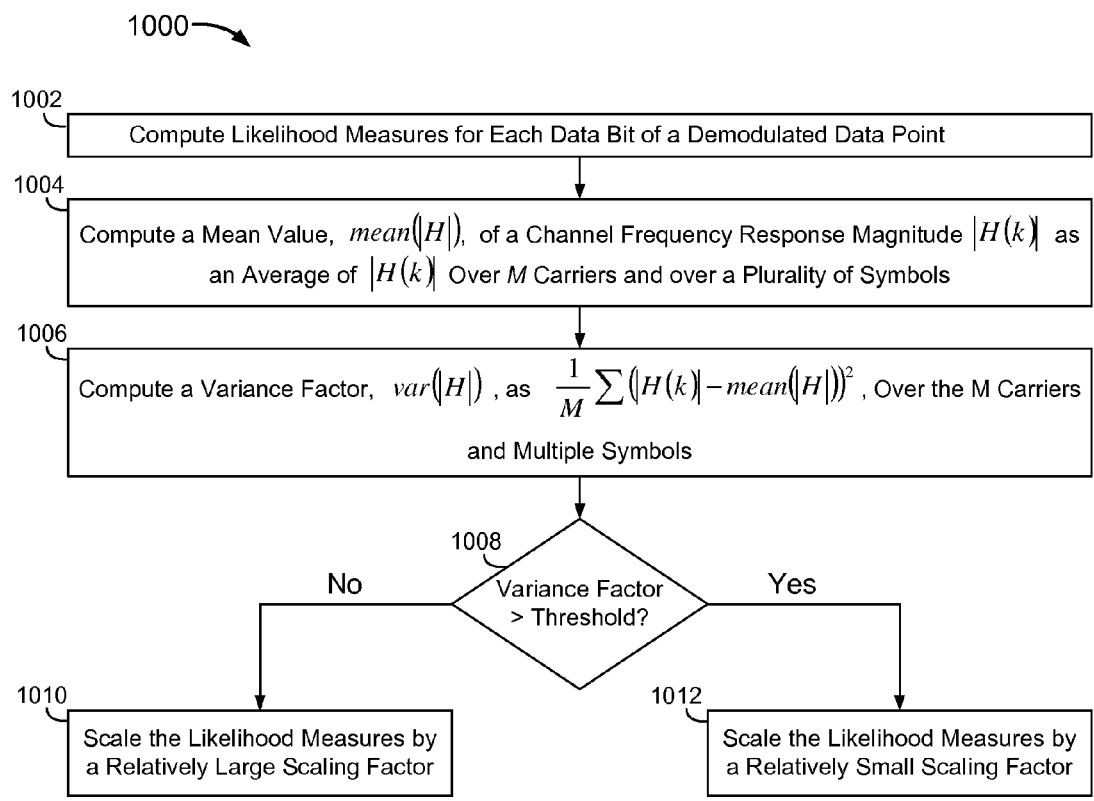
FIG. 10 is a flowchart of a method of scaling likelihood measures as a function of a channel frequency response variance.

FIG. 10 is a flowchart of a method 1000 of scaling likelihood measures as a function of a channel frequency response variance.

At 1002, likelihood measures are computed for each data bit of a demodulated data point, such as described in one or more examples above.

At 1004, a mean value, mean(|H|), of a channel frequency response magnitude |H(k)| is computed as an average of |H(k)| over M carriers and over a plurality of symbols, where M is a positive integer.

At 1006 a variance factor var(|H|) is computed as:

$$\text{var}(|H|) = \frac{1}{M} \sum (|H(k)| - \text{mean}(|H|))^2, \quad \text{Eq. 7}$$

over the M carriers and over multiple symbols.

At 1008, the variance factor is compared to a threshold.

Where a channel is defined predominantly by additive white Gaussian noise (AWGN), the channel frequency response may be relatively flat and the variance factor may be relatively small. Where the variance factor is below the threshold at 1008, indicating that the channel frequency response is relatively flat, the likelihood measures may be scaled with a relatively large scaling factor at 1010. The relatively large scaling factor may be, for example, approximately 3.5.

Where a channel includes relatively substantial multi-path or echo, the channel frequency response may have relatively significant peaks and troughs, and the variance factor may be relatively large. Where the variance factor exceeds the threshold at 1008, the likelihood measures may be scaled with a relatively small scaling factor at 1012. The relatively small scaling factor may be, for example, approximately 1.5. Scaling factors of 1.5 and 3.5 are provided for illustrative purposes. Other scaling factors may be utilized.

As another example, a variance factor may be determined as a function of a difference between magnitudes of channel frequency responses of different carriers, such as a difference between largest and smallest channel frequency responses.

As another example, a variance factor may be determined as a function of a channel impulse response, such as described below with respect to FIGS. 11 and 12.

Figure 11:
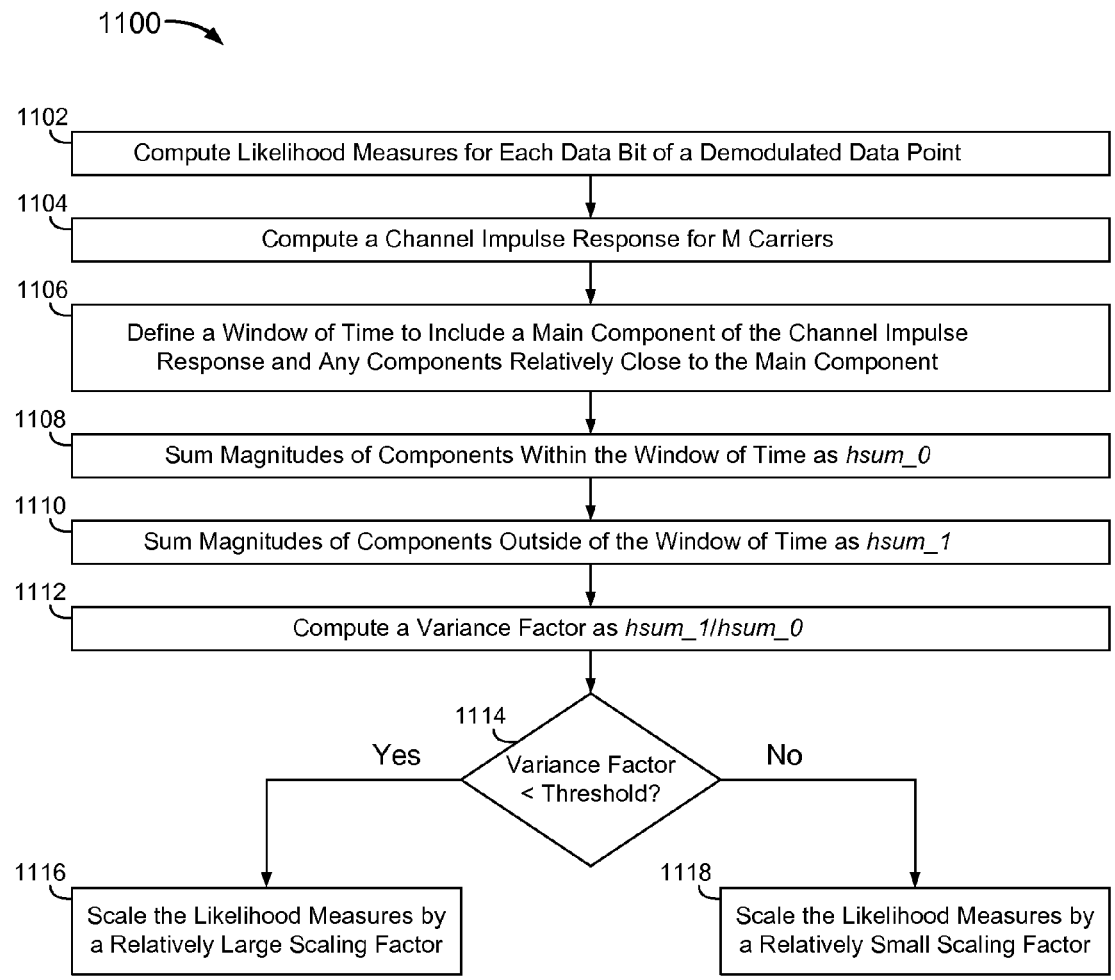
FIG. 11 is a flowchart of a method of scaling likelihood measures as a function of a channel impulse response variance.

FIG. 11 is a flowchart of a method 1100 of scaling likelihood measures as a function of a channel impulse response variance. Method 1100 is described below with reference to FIG. 12. Method 1100 is not, however, limited to the example of FIG. 12.

At 1102 of FIG. 11, likelihood measures are computed for each data bit of a demodulated data point, such as described in one or more examples above.

At 1104, a channel impulse response is computed for M carriers, where M is a positive integer.

At 1106, a window of time is defined to include a main component of the channel impulse response and any components that are relatively close in time to the main component.

Figure 12:
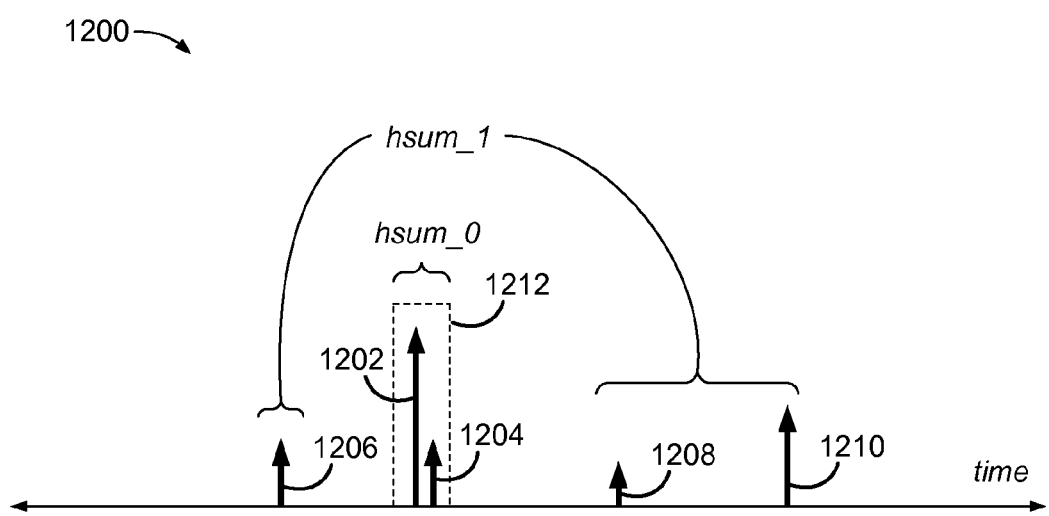
FIG. 12 is a graphic depiction of a channel impulse response.

FIG. 12 is a graphic depiction of a channel impulse response 1200, including a main component 1202, which may correspond to a largest magnitude component. Channel impulse response 1200 may include one or more additional components, illustrated here as components 1204, 1206, 1208, and 1210.

A relatively small window of time 1212 may be defined to include main component 1202 and any components relatively proximate to main component 1202.

At 1108, magnitudes of components within window 1212, illustrated here as components 1202 and 1204, are summed as hsum_0.

At 1110, magnitudes of components outside of window 1212, illustrated here as components 1206, 1208, and 1210, are summed as hsum_1.

At 1112, a variance factor is computed as a ratio of hsum_1/hsum_0.

At 1114, the variance factor is compared to a threshold.

Where the channel is defined predominately by AWGN, hsum_1 may be relatively small compared to hsum_0, and the variance factor may be relatively small. For a near-zero dB echo, hsum_0 may be of approximately the same order as hsum_1, and the variance factor may approach unity.

Where the variance factor is below a threshold at 1114, the likelihood measures may be scaled with a relatively large scaling factor at 1116.

Where the variance factor is above the threshold at 1114, the likelihood measures may be scaled with a relatively small scaling factor at 1118.

A scaling factor and/or an underlying variance factor may be updated every symbol, or less frequently. For example, in a relatively stationary environment where the communication channel is relatively static, such as a stationary digital television system, a scaling factor may be updated relatively infrequently. In a mobile environment, such as a mobile digital television system where the channel may change, a scaling factor may be updated more frequently.

Returning to FIG. 3, at 308, the data samples demodulated at 302 are decoded based on the scaled likelihood measures. Decoding at 308 may include low density parity check (LDPC) decoding.

One or more features disclosed herein may be performed with one or more suitably configured systems, such as described below with respect to FIGS. 13 and 14.

Figure 13:
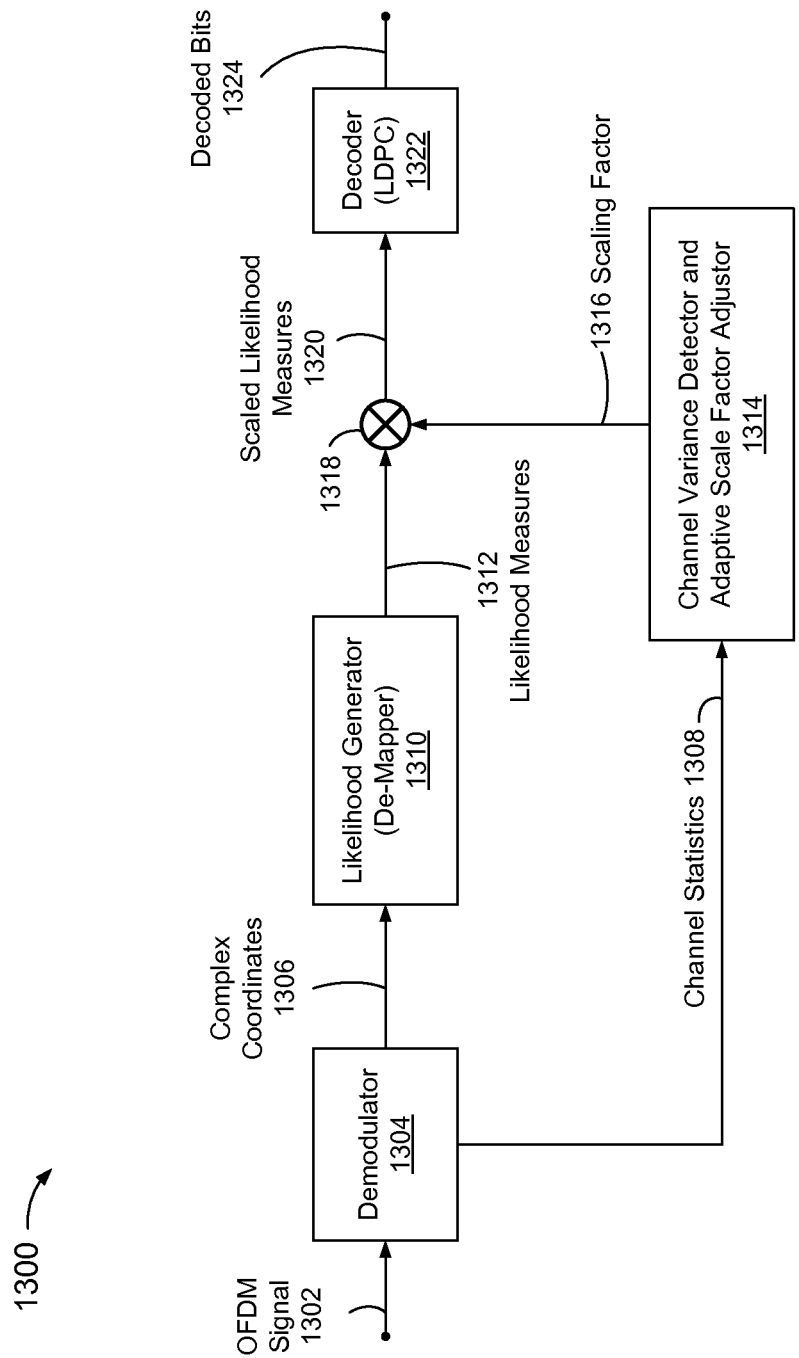
FIG. 13 is a block diagram of a receiver system to compute and scale likelihood measures as a function of a channel variance.

FIG. 13 is a block diagram of a receiver 1300.

Receiver 1300 includes a demodulator 1304 to demodulate and sample a received signal, illustrated here as an OFDM signal 1302, and to output complex coordinates 1306.

Demodulator 1304 may be configured to compute a channel statistic 1308, which may include one or more of a channel frequency response statistic and a channel impulse response statistic, such as described in one or more examples above. Demodulator 1304 may include an equalizer to compute or estimate channel statistics 1308.

Receiver 1300 may include a likelihood generator 1310 to compute likelihood measures 1312 from complex coordinates 1306, relative to points of a reference constellation Likelihood generator 1310 may be configured to determine distances in accordance with equation 1, and to compute likelihood measures 1312 as LLRs, such as described in one or more examples above.

Receiver 1300 may include a channel variance detector and adaptive scale factor system 1314 to compute a variance factor as a function of channel statistic 1308, and to select a scaling factor 1316 based on a value of the variance factor, such as described in one or more examples above.

Receiver 1300 may include a module 1318 to scale likelihood measures 1312 by scaling factor 1316, and to output scaled likelihood measures 1320. Module 1318 may include a multiplier or a programmable gain module.

Receiver 1300 may include a decoder 1322 to decode data bits 1324 based on scaled likelihood measures 1320. Decoder 1322 may include an LDPC decoder.

Where real and imaginary components are interleaved amongst carriers of received signal 1302, a receiver may include de-interleaver components, such as described below with respect to FIG. 14.

Figure 14:
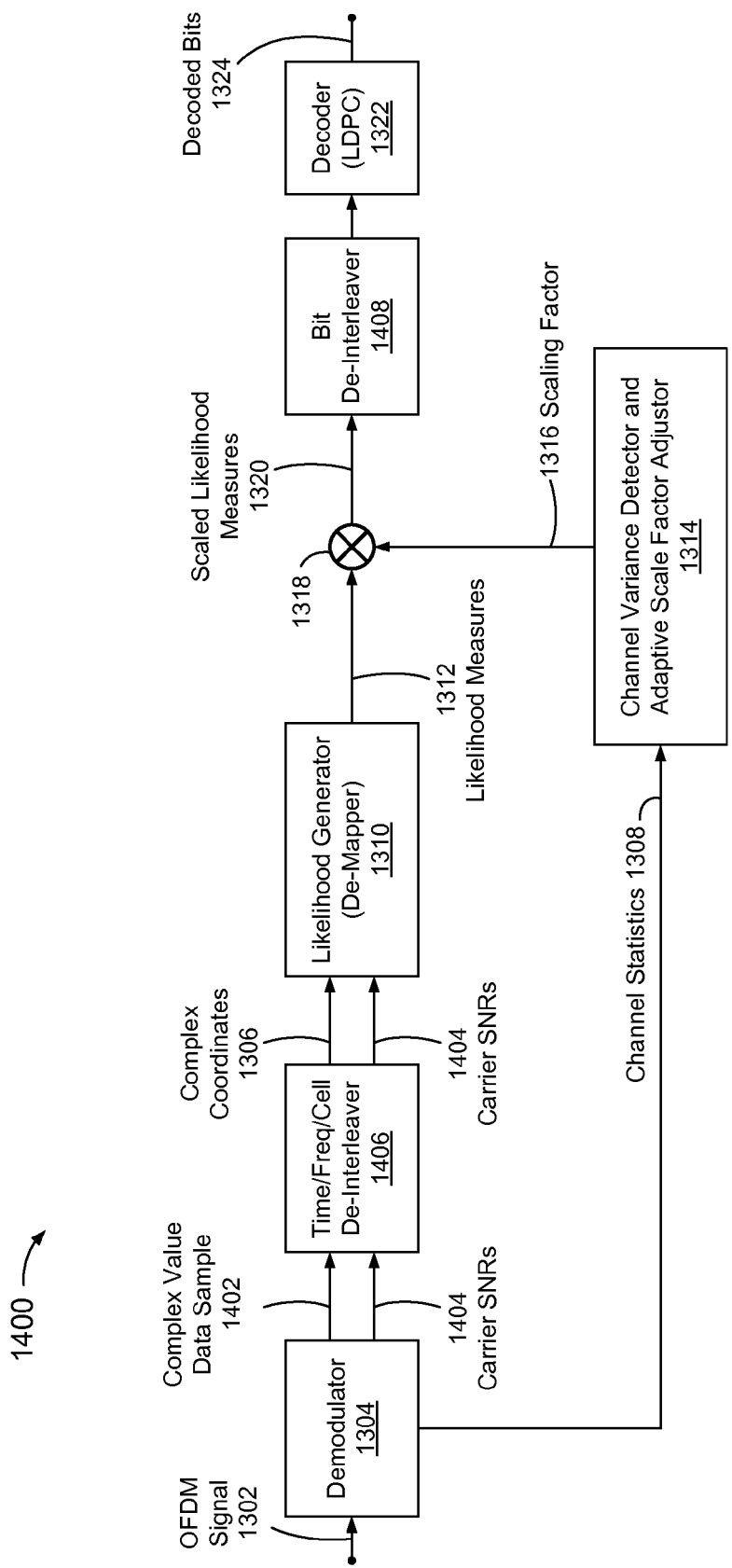
FIG. 14 is a block diagram of another receiver system to compute and scale likelihood measures as a function of a channel variance.

FIG. 14 is a block diagram of a receiver 1400, which may include demodulator 1304, likelihood generator 1310, channel variance detector and adaptive scale factor system 1314, module 1318, and decoder 1322, such as described above with respect to FIG. 13. Receiver 1400 may include one or more of a time de-interleaver, a frequency de-interleaver, a cell de-interleaver, and a bit de-interleaver, illustrated here as a time/frequency/cell de-interleaver 1406 and a bit de-interleaver 1408, to perform de-interleave functions, as is well known.

In FIG. 14, demodulator 1304 may be configured to output complex value data samples 1402 and per-carrier SNRs 1404, such as described in one or more examples above. Time/frequency de-interleaver 1406 may be configured to determine complex coordinates 1306 of data points, from complex value data samples 1402. Likelihood generator 1310 may be configured to scale x and y axis distance computations as a function of corresponding per-carrier SNRs 1404, such as described above with respect to equation 2.

Receiver 1300 and/or receiver 1400 may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. The terms software, code, and instructions, as used herein, refer to a computer program product including a computer readable medium having computer program logic stored therein to cause a computer system to perform one or more functions in response thereto.

Figure 15:
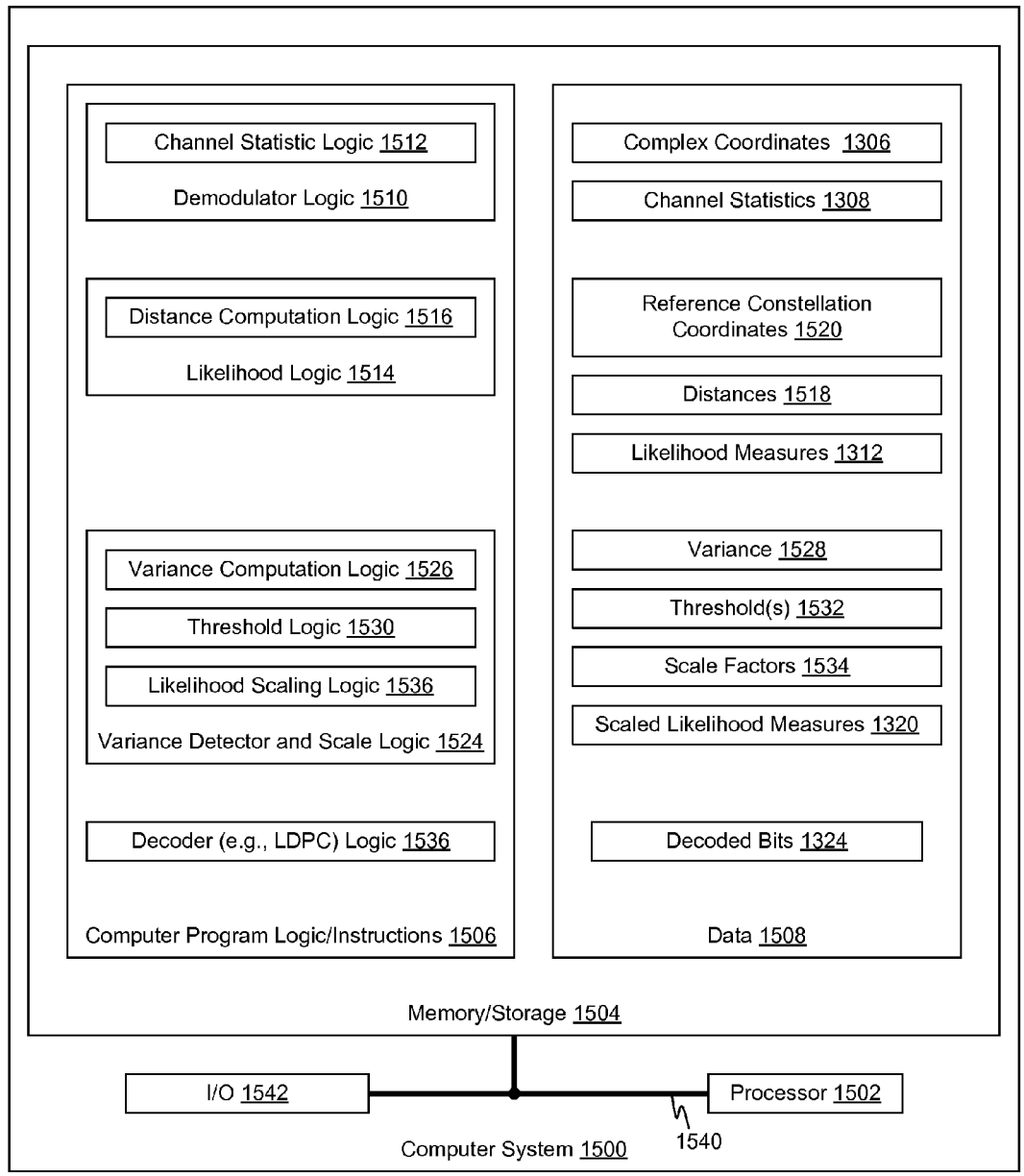
FIG. 15 is a block diagram of a computer system configured to compute and scale likelihood measures as a function of a channel variance.

FIG. 15 is a block diagram of a computer system 1500, configured to compute and scale likelihood measures as a function of a channel variance.

Computer system 1500 includes one or more computer instruction processing units, illustrated here as a processor 1502, to execute computer program logic.

Computer system 1500 includes one or more of memory, cache, registers, and storage (hereinafter, "memory") 1504, including a computer readable medium having computer program product logic or instructions 1506 stored thereon, to cause processor 1502 to perform one or more functions in response thereto.

Memory 1504 further includes data 1508 to be used by processor 1502 in executing logic 1506, and/or generated by processor 1502 in response to execution of logic 1506.

Logic 1506 may include demodulator logic 1510 to cause processor 1502 to demodulate complex coordinates 1306 from a received signal, such as described in one or more examples above.

Demodulator logic 1510 may include channel statistic logic 1512 to cause processor 1502 to compute channel statistics 1308, such as described in one or more examples above.

Logic 1506 may include likelihood logic 1514 to cause processor 1502 to compute likelihood measures 1312 from complex coordinates 1306, such as described in one or more examples above.

Likelihood logic 1514 may include distance computation logic 1516 to cause processor 1502 to compute distances 1518 between complex coordinates 1306 and reference constellation coordinates 1520, such as described in one or more examples above.

Logic 1506 may include variance detector and scale logic 1524 to cause processor 1502 to scale likelihood measures 1312 as a function of a variance in channel statistics 1308.

Variance detector and scale logic 1524 may include variance computation logic 1526 to cause processor 1502 to compute one or more variance factors 1528 from channel statistics 1308, such as described in one or more examples above.

Variance detector and scale logic 1524 may include threshold logic 1530 to cause processor 1502 to compare a variance factor 1528 to one or more thresholds 1532, and to select one of a plurality of scale factors 1534 based on results of the comparison, such as described in one or more examples above.

Variance detector and scale logic 1524 may include likelihood scaling logic 1536 to cause processor 1502 to scale likelihood measures 1312 with a selected scale factor 1534 to provide scaled likelihood measures 1320, such as described in one or more examples above.

Logic 1506 may include decoder logic 1536 and to cause processor 1502 to decode bits 1324 from scaled likelihood measures 1320, such as described in one or more examples above.

Computer system 1500 may be configured to process interleaved signals. For example, logic 1506 may include de-interleave logic, demodulator logic 1510 may include per-carrier SNR computation logic, and distance computation logic 1516 may include logic to scale distances 1518 as a function of the per-carrier SNRs, such as described in one or more examples above.

Computer system 1500 may include a communications infrastructure 1540 to communicate amongst devices of computer system 1500.

Computer system 1500 may include an input/output controller 1542 to interface with one or more other systems.

Processor 1502 may include a programmable controller, and logic 1506 or portions thereof may be provisioned within firmware. Firmware-based logic may provide flexibility, such as to permit subsequent revision and/or fine-tuning of logic. A controller and firmware may be implemented as part of demodulator 1304 in FIG. 13 and/or FIG. 14.

Effects of scaling factors on LDPC decoding performance have been evaluated under AWGN and Zero dB echoes with additive noise conditions. AWGN and Zero dB echoes represent opposing ends of a spectrum of channel conditions. With AWGN, there are substantially no echoes. With Zero dB, an echo is substantially as strong as a main signal. Additionally, with zero dB, the echo may delayed from the main signal by a relatively considerable amount, which may be relatively close to an edge of a guard interval, such as near 90% of the guard interval. A guard length may be selected to be approximately 25% of a useful symbol period. Since the echo is within the guard interval there may be little or no inter-symbol-interference (ISI). The frequency response may, however, have troughs and peaks within a useful signal bandwidth.

SNR results are provided below for 256-QAM rotated constellations with an LDPC code rate of ½.

The Max-Log-MAP technique of Eq. 4 and the Full-Log-MAP technique of Eq. 3, were evaluated with an AWGN channel and various fixed values of scale factor K of Eq. 6.

With scale factor K equal to 3.5, Quasi-error-free (QEF) performance was achieved for both techniques at 14.3 dB SNR.

As scale factor K was reduced, performance of the Max-Log-MAP technique fell more sharply than performance of the Full-Log-MAP technique. For example, when the scale factor was reduced to 2.0, the Max-Log-MAP QEF SNR increased to about 14.8 dB (a loss of 0.5 dB), while the Full-Log-MAP QEF SNR increased only slightly to 14.4 dB. When the scale factor was reduced to 1.5, the Max-Log-MAP QEF SNR increased to 15.3 dB (a loss of 1 dB).

The Max-Log-MAP technique was also evaluated with a Zero dB echo channel and various fixed values of scale factor K. With scale factor K equal to 1.5, QEF performance was achieved at 16.7 dB. When scale factor K was increased to 3.5, the QEF SNR increased to 17.6 dB (a loss of 0.9 dB).

For a fixed scaling factor K, the Full-Log-MAP technique may provide suitable or near-optimum performance over a relatively wide range of channel conditions.

For a less-than-Full-Log-MAP technique, such as the Max-Log-MAP technique or the Max-4-Log-MAP technique, a single or fixed scaling factor K may be optimized for a relatively narrow range of channel conditions. Where a fixed scale factor K is optimized for an AWGN channel, and where a zero dB echo condition is encountered, a receiver may operate at approximately 1 dB below where it might operate if scale factor K is optimized for the zero dB echo condition. Similarly, where a fixed scale factor K is optimized for a zero dB channel, and where an AWGN condition is encountered, the receiver may operate at approximately 1 dB below where it might operate if scale factor K is optimized for the AWGN condition.

For a less-than-Full-Log-MAP technique, dynamic adjustment of scaling factor K in response to a channel statistic or channel condition, as disclosed herein, may reduce quasi-error-free SNR, and may provide near-optimum performance over a relatively wide range of channel conditions.

Dynamic scaling may improve decoding accuracy where likelihood measures are computed from distances to less than all constellation points, and where likelihood measures computed are computed from all constellation points.

Methods and systems disclosed herein may be implemented with respect to an OFDM-based digital television application, and may be implemented with respect to one or more of a plurality of digital video broadcast standards that provide for low density parity check (LDPC) decoding, which may include one or more of:

- a digital video broadcast, second generation terrestrial (DVB-T2) standard, developed under oversight of the DVB Project, a consortium of broadcasters, manufacturers/developers, network operators, regulatory entities, and published by the European Telecommunications Standards Institute (ETSI) in September 2009 as EN 302 755;
- a DMB-T/H or DTMB (GB 20600-2006) digital terrestrial television standard adopted in the People's Republic of China (PRC), including Hong Kong and Macau, on Aug. 1, 2007; and
- a digital video broadcast, second generation over cable (DVB-C2), approved by the DVB Steering Board in April 2009.

Methods and systems disclosed herein may be implemented with respect to one or more standards that may be revised to provide for LDPC decoding, which may include an Integrated Services Digital Broadcasting (ISDB) standard, maintained by the Association of Radio Industries and Businesses (ARIB) of Japan.

Methods and systems disclosed herein may be implemented with respect to other forward error correcting techniques including, for example, techniques based on turbo codes.

Methods and systems disclosed herein may be implemented with respect to a multi-standard OFDM-based multi-standard digital broadcast demodulator.

Methods and systems disclosed herein are not, however, limited to digital video.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A system, comprising:
a demodulator to demodulate a set of complex coordinates from a received signal;
a likelihood measure system to compute a likelihood measure for each of n bits associated with the set of demodulated complex coordinates relative to points of a reference constellation, wherein each point of the reference constellation is associated with an n-bit value that is exclusive to the corresponding point;
a channel statistic detector and scaler system to
determine a channel statistic of the received signal, including compute a channel frequency response statistic as a function of a difference between largest and smallest carrier channel frequency response magnitudes amongst multiple carriers of the received signal, and
scale the likelihood measures as a function of the channel frequency response statistic; and
a decoder to correlate the n-bits of the demodulated complex coordinates with one of the n-bit values of the reference constellation based on the scaled likelihood measures.

2. The system of claim 1, wherein the likelihood measure system is configured to compute the likelihood measures as a function of distances to a subset of points of the reference constellation.

3. The system of claim 1, wherein the channel statistic detector and scaler system is configured to compute a channel impulse response statistic amongst a plurality of instances of the received signal and to scale the likelihood measures as a function of the channel impulse response statistic.

4. The system of claim 3, wherein the channel statistic detector and scaler system is further configured to compute the channel impulse response statistic as a function of a ratio of a sum of magnitudes of channel impulse response components within a window of time, to a sum of magnitudes of channel impulse response components outside of the window of time.

5. A method, comprising:
demodulating a set of complex coordinates from a received signal;
computing a likelihood measure for each of n bits associated with the set of demodulated complex coordinates relative to points of a reference constellation, wherein each point of the reference constellation is associated with an n-bit value that is exclusive to the corresponding point;
determining a channel statistic of the received signal, including computing a channel frequency response statistic as a function of a difference between largest and smallest carrier channel frequency response magnitudes amongst multiple carriers of the received signal;
scaling the likelihood measures as a function of the channel frequency response statistic; and
correlating the n-bits of the demodulated complex coordinates with one of the n-bit values of the reference constellation based on the scaled likelihood measures;
wherein at least the computing, the determining, the scaling, and the correlating are performed in a suitably configured system.

6. The method of claim 5, wherein the computing of the likelihood measures includes:
computing the likelihood measures as a function of distances to a subset of points of the reference constellation.

7. The method of claim 5, wherein:
the determining of the channel statistic includes computing a channel impulse response statistic amongst a plurality of instances of the received signal; and
the scaling includes scaling the likelihood measures as a function of the channel impulse response statistic.

8. The method of claim 7, wherein the computing of the channel impulse response statistic includes computing the channel impulse response statistic as a function of a ratio of a sum of magnitudes of channel impulse response components within a window of time, to a sum of magnitudes of channel impulse response components outside of the window of time.

9. A computer program product including a non-transitory computer readable medium having computer program logic stored therein, the computer program logic comprising:
likelihood logic to cause a computer system to compute a likelihood measure for each of n bits associated with a set of complex coordinates demodulated from a received signal, relative to points of a reference constellation, wherein each point of the reference constellation is associated with an n-bit value that is exclusive to the corresponding point;
channel statistic and scaler logic to cause the computer system to determine a channel statistic of the received signal, including to
compute a channel frequency response statistic as a function of a difference between largest and smallest carrier channel frequency response magnitudes amongst multiple carriers of the received signal, and
scale the likelihood measures as a function of the channel frequency response statistic; and
logic to cause the computer system to correlate the n-bits of the demodulated complex coordinates with one of the n-bit values of the reference constellation based on the scaled likelihood measures.

10. The computer program product of claim 9, wherein the likelihood logic includes logic to cause the computer system to compute the likelihood measures as a function of distances to a subset of points of the reference constellation.

11. The computer program product of claim 9, wherein the channel statistic and scaler logic includes:
channel impulse response statistic logic to cause the computer system to compute a channel impulse response statistic amongst a plurality of instances of the received signal as a function of a ratio of a sum of magnitudes of channel impulse response components within a window of time, to a sum of magnitudes of channel impulse response components outside of the window of time; and
logic to cause the computer system to scale the likelihood measures as a function of the channel impulse response statistic.

12. A system, comprising:
a demodulator to demodulate a set of complex coordinates from a received signal;
a likelihood measure system to compute a likelihood measure for each of n bits associated with the set of demodulated complex coordinates relative to points of a reference constellation, wherein each point of the reference constellation is associated with an n-bit value that is exclusive to the corresponding point;
a channel statistic detector and scaler system to determine a channel statistic of the received signal, including to:

compute a mean channel frequency response magnitude as a function of per symbol channel frequency response magnitudes of each of multiple M carriers, averaged over multiple symbols, wherein M is a positive integer; and compute a channel frequency response statistic over a plurality of symbols as a function of differences between the mean channel frequency response magnitude and the per symbol channel frequency response magnitudes of each of the M carriers;

scale the likelihood measures as a function of the channel frequency response statistic; and a decoder to correlate the n-bits of the demodulated complex coordinates with one of the n-bit values of the reference constellation based on the scaled likelihood measures.

13. A method, comprising:

demodulating a set of complex coordinates from a received signal;

computing a likelihood measure for each of n bits associated with the set of demodulated complex coordinates relative to points of a reference constellation, wherein each point of the reference constellation is associated with an n-bit value that is exclusive to the corresponding point;

determining a channel statistic of the received signal, including:

computing a mean channel frequency response magnitude as a function of per symbol channel frequency response magnitudes of each of multiple M carriers, averaged over multiple symbols, wherein M is a positive integer; and computing a channel frequency response statistic over a plurality of symbols as a function of differences between the mean channel frequency response magnitude and the per symbol channel frequency response magnitudes of each of the M carriers;

scaling the likelihood measures as a function of the channel frequency response statistic; and correlating the n-bits of the demodulated complex coordinates with one of the n-bit values of the reference constellation based on the scaled likelihood measures, wherein at least the computing, the determining, the scaling, and the correlating are performed in a suitably configured system.

14. A computer program product including a non-transitory computer readable medium having computer program logic stored therein, the computer program logic comprising:

likelihood logic to cause a computer system to compute a likelihood measure for each of n bits associated with a set of complex coordinates demodulated from a received signal, relative to points of a reference constellation, wherein each point of the reference constellation is associated with an n-bit value that is exclusive to the corresponding point;

channel statistic and scaler logic to cause the computer system to determine a channel statistic of the received signal, including:

logic to cause the computer system to compute a mean channel frequency response magnitude as a function of per symbol channel frequency response magnitudes of each of multiple M carriers, averaged over multiple symbols, wherein M is a positive integer; and logic to cause the computer system to compute a channel frequency response statistic over a plurality of symbols as a function of differences between the mean channel frequency response magnitude and the per symbol channel frequency response magnitudes of each of the M carriers;

logic to cause the computer system to scale the likelihood measures as a function of the channel frequency response statistic; and logic to cause the computer system to correlate the n-bits of the demodulated complex coordinates with one of the n-bit values of the reference constellation based on the scaled likelihood measures.

* * * * *